United States Patent
Shiratori et al.

(10) Patent No.: US 10,053,031 B2
(45) Date of Patent: Aug. 21, 2018

(54) WIRE HARNESS

(71) Applicant: YAZAKI CORPORATION, Tokyo (JP)

(72) Inventors: Tatsuya Shiratori, Shizuoka (JP); Hideaki Kikuchi, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 176 days.

(21) Appl. No.: 15/163,226

(22) Filed: May 24, 2016

(65) Prior Publication Data

US 2016/0347268 A1    Dec. 1, 2016

(30) Foreign Application Priority Data

May 29, 2015    (JP) ................................. 2015-109564

(51) Int. Cl.
   *B60R 16/03*    (2006.01)
(52) U.S. Cl.
   CPC .................................... *B60R 16/03* (2013.01)
(58) Field of Classification Search
   None
   See application file for complete search history.

(56) References Cited

U.S. PATENT DOCUMENTS

| | | | |
|---|---|---|---|
| 2008/0143292 A1* | 6/2008 | Ward | B60L 8/003 320/101 |
| 2008/0157539 A1* | 7/2008 | Tani | F02D 41/021 290/40 C |
| 2010/0307447 A1* | 12/2010 | Sposato | F01M 5/021 123/196 AB |
| 2015/0291052 A1* | 10/2015 | Nakazawa | B60L 8/003 320/101 |
| 2016/0380473 A1* | 12/2016 | Henningson | B60L 11/1811 320/101 |

FOREIGN PATENT DOCUMENTS

| | | |
|---|---|---|
| JP | 52-52626 U | 4/1977 |
| JP | 6-86402 A | 3/1994 |
| JP | 2000-229545 A | 8/2000 |
| JP | 2003-143705 A | 5/2003 |
| JP | 2007-124745 A | 5/2007 |
| JP | 2011-68283 A | 4/2011 |
| JP | 2014-24417 A | 2/2014 |
| JP | 2015-57009 A | 3/2015 |

OTHER PUBLICATIONS

Japanese Office Action for the related Japanese Patent Application No. 2015-109564 dated Jul. 4, 2017.

* cited by examiner

*Primary Examiner* — Jared Fureman
*Assistant Examiner* — Joel Barnett
(74) *Attorney, Agent, or Firm* — Kenealy Vaidya LLP (57) ABSTRACT

A wire harness includes power source control boxes, electric wires, and connection wires. The power source control boxes are provided to respective sections. The electric wires connect the power source control boxes to power-requiring devices in the respective sections. The connection wires connect the power source control boxes provided to the respective sections to power-generating devices provided in at least one of the sections to perform power generation different from that performed by a regenerative brake while a vehicle is traveling. The power source control boxes supply electrical energy generated by the power-generating devices to the power-requiring devices in the sections in which the respective power source control boxes are provided.

3 Claims, 5 Drawing Sheets

WIRE HARNESS

CROSS-REFERENCE TO RELATED APPLICATION(S)

The present application claims priority to and incorporates by reference the entire contents of Japanese Patent Application No. 2015-109564 filed in Japan on May 29, 2015.

BACKGROUND OF THE INVENTION

1. Field of the Invention

The present invention relates to a wire harness.

2. Description of the Related Art

There has been developed a vehicle including a power-generating device, such as a solar panel, and that stores electrical energy from the power-generating device in a power storage unit and supplies the electrical energy stored in the power storage unit to power-requiring devices in the vehicle (refer to Japanese Patent Application Laid-open No. 2015-57009). Such a vehicle can generate electrical energy besides regenerated energy produced in electric vehicles, for example, and supply it to the power-requiring devices in the vehicle.

The technology described in Japanese Patent Application Laid-open No. 2015-57009 guides the electrical energy from the solar panel to the power storage unit, stores it in the power storage unit, and then supplies it to the power-requiring devices in the vehicle. This configuration has a loss in the generated electric power when being guided from the solar panel to the power storage unit, a loss in the electric power when being stored, and a loss in the electric power when being guided from the power storage unit to the power-requiring devices. The technology has room for improvement in supplying the electrical energy from the power-generating device to the devices.

SUMMARY OF THE INVENTION

In view of the disadvantage described above, the present invention aims to provide a wire harness that can supply electrical energy from a power-generating device more efficiently to power-requiring devices.

According to one aspect of the present invention, a wire harness includes a power source control box provided to each of a plurality of sections obtained by dividing a vehicle; a main power wire configured to supply electric power from a vehicle battery to the power source control box; an electric wire configured to connect the power source control box to a power-requiring device in the same section, the wire harness supplying the electric power supplied from the vehicle battery through the main power wire from the power source control box in a section to the power-requiring device in the section through the corresponding electric wire; and a connection wire configured to connect a power-generating device provided in at least one section to perform power generation different from power generation performed by a regenerative brake while the vehicle is traveling to the power source control box provided to the section, wherein the power source control box supplies, when receiving electrical energy generated by the power-generating device through the connection wire, the electrical energy to the power-requiring device in the section in which the power source control box is provided.

The wire harness according to the present embodiment includes the power source control box and the connection wire. The power source control box is provided to a plurality of the sections obtained by dividing the vehicle. The connection wire connects the power-generating device provided to at least one section to perform power generation to the power source control box in the section. The electrical energy from the power-generating device is transmitted to the power source control box in the same section. With this configuration, the electrical energy is supplied to the power source control box through relatively short wiring. When receiving the electrical energy generated by the power-generating device, the power source control box supplies it to the power-requiring device in the section in which the power source control box is provided. As a result, the power source control box supplies the electrical energy directly to the power-requiring device in the same section without storing it in the vehicle battery. The wire harness thus can reduce a loss in the generated electrical energy when being guided to the power source control box and a loss in the electrical energy when being guided from the power source control box to the power-requiring device. The wire harness can also reduce a charging loss in the electrical energy when being stored in the vehicle battery. Consequently, the present invention can provide the wire harness that can supply the electrical energy from the power-generating device more efficiently to the power-requiring device.

According to another aspect of the present invention, it is preferable that the power source control box includes a switching means that switches between a first state to supply the electrical energy from the power-generating device to the power-requiring device in the same section and a second state not to supply the electrical energy, and the switching means preferably switches to the first state when the power-generating device supplies electrical energy having a voltage of a predetermined value to operate the power-requiring device and when a current value of the electrical energy is equal to or higher than a predetermined value to be sufficiently high to operate the power-requiring device.

In a case where the power-generating device supplies electrical energy having a voltage of the predetermined value to operate the power-requiring device, that is, where a stabilization function that maintains the electrical energy at the predetermined voltage is provided to the power-generating device or a portion between the power-generating device and the power source control box, a drive voltage for the power-requiring device is secured. If a monitored current value is equal to or higher than the set value, the power source control box supplies the electrical energy from the power-generating device to the power-requiring device. With this configuration, the wire harness can prevent the power source control box from supplying, to the power-requiring device, insufficient electrical energy to operate it and thus prevent the power-requiring device from failing to operate, for example.

According to still another aspect of the present invention, it is preferable that the switching means supplies the electrical energy from the power-generating device to the vehicle battery when the switching unit is in the second state.

When the switching unit is in the second state, the wire harness supplies the electrical energy from the power-generating device to the vehicle battery. If the switching unit receives insufficient electrical energy to operate the power-requiring device, for example, the switching unit stores it in the vehicle battery without discarding it With this configuration, the wire harness can prevent the generated electrical energy from being wasted by storing it when the amount of generated power is small.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments according to the present invention are described below. The embodiments below are not intended to limit the present invention, and various changes may be made without departing from the spirit of the invention.

Figure 1:
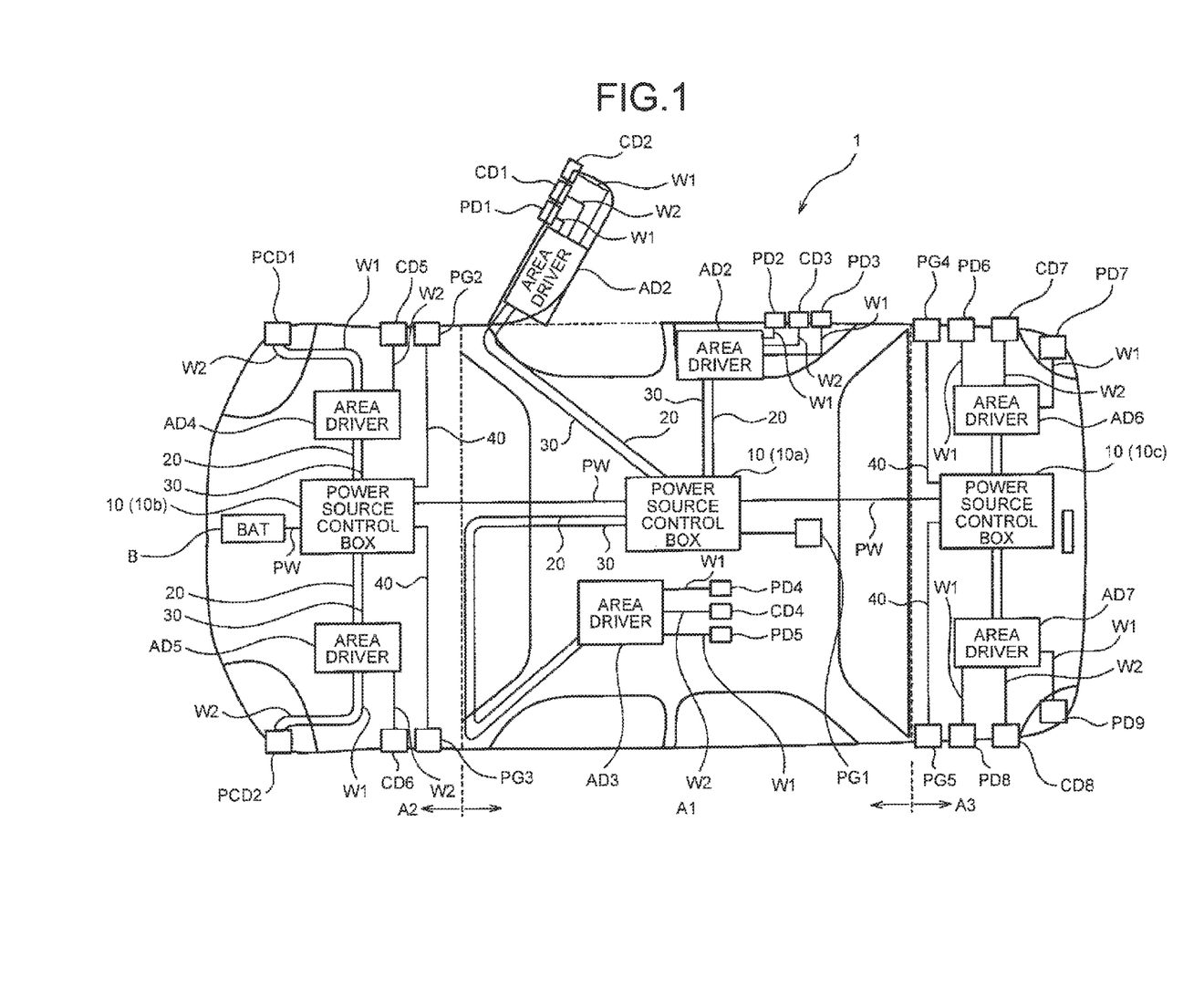
FIG. 1 is a diagram illustrating a configuration of a wire harness according to an embodiment of the present invention.

FIG. 1 is a diagram illustrating a configuration of a wire harness according to an embodiment of the present invention. As illustrated in FIG. 1, a wire harness 1 according to the present embodiment is arranged in a vehicle and connected to a plurality of devices PD1 to PD9, CD1 to CD8, PCD1 and PCD2, and PG1 to PG5. The wire harness 1 includes a plurality of (three, in the present embodiment) power source control boxes 10, main power wires PW, electric wires 20, 30, W1, and W2, and connection wires 40.

The power source control boxes 10 are provided to respective sections A1 to A3 obtained by dividing the vehicle. The power source control boxes 10 each function as a central unit that performs power distribution, input of signals, and other processing in the respective sections A1 to A3. The vehicle according to the present embodiment is divided into the three sections A1 to A3 of a central section A1, a front section A2, and a rear section A3. The central section A1 is provided with a first power source control box 10a, the front section A2 is provided with a second power source control box 10b, and the rear section A3 is provided with a third power source control box 10c.

While the number of sections according to the present embodiment is three, and the number of power source control boxes 10 is also three, the embodiment is not limited thereto. The number of sections and the number of power source control boxes 10 may be two or four or more. In the following description, to specify all the power source control boxes or not to specify any one of them, the power source control boxes are collectively denoted by a reference numeral 10. To specify any one of them, the power source control boxes are individually denoted by a reference numeral 10a, 10b, or 10c.

The main power wires PW are electric wires that supply electric power from a vehicle battery B to the respective power source control boxes 10. More specifically, the vehicle battery B is provided to the front section A2 and connected to the second power source control box 10b through the main power wire PW. The electric power from the vehicle battery B is thus supplied to the second power source control box 10b. The second power source control box 10b is connected to the first power source control box 10a through the main power wire PW, and the first power source control box 10a is connected to the third power source control box 10c through the main power wire PW. With this configuration, the electric power supplied from the vehicle battery B to the second power source control box 10b is supplied to the first power source control box 10a and the third power source control box 10c through the respective main power wires PW.

The electric wires 20 and W1 connect the power source control boxes 10 to the power-requiring devices PD1 to PD9, PCD1, and PCD2 in the respective sections. The electric power supplied from the vehicle battery B to the power source control boxes 10 is supplied to the power-requiring devices PD1 to PD9, PCD1, and PCD2 through the electric wires 20 and W1. In other words, the electric power from the vehicle battery B is transmitted to the first power source control box 10a and supplied from the first power source control box 10a to the power-requiring devices PD1 to PD5 in the central section A1. Similarly, the electric power from the vehicle battery B is transmitted to the second power source control box 10b and supplied from the second power source control box 10b to the power-requiring communication devices PCD1 and PCD2 in the front section A2. Furthermore, the electric power from the vehicle battery B is transmitted to the third power source control box 10c and supplied from the third power source control box 10c to the power-requiring devices PD6 to PD9 in the rear section A3.

The vehicle according to the present embodiment is provided with four types of devices PD1 to PD9, CD1 to CD8, PCD1 and PCD2, and PG1 to PG5. The devices of the first type are the power-requiring devices PD1 to PD9. The power-requiring devices PD1 to PD9 operate by receiving electric power and correspond to a motor, for example.

The devices of the second type are the communication devices CD1 to CD8. The communication devices CD1 to CD8 transmit signals to the power source control boxes 10 and correspond to a sensor or the like, for example. The communication devices CD1 to CD8 are also connected to the power source control boxes 10 through the electric wires 30 and W2.

The devices of the third type are the power-requiring communication devices PCD1 and PCD2. The power-requiring communication devices PCD1 and PCD2 receive electric power, operate with the supplied electric power, and transmit acquired information to the power source control box 10. The power-requiring communication devices PCD1 and PCD2 have both functions of an power-requiring device and a communication device. The power-requiring communication devices PCD1 and PCD2 are also connected to the power source control box 10 through the electric wires 20, 30, W1, and W2. The power-requiring communication devices PCD1 and PCD2 correspond to a camera (image-capturing means) that outputs image signals obtained by capturing its surroundings or a sonar (distance-measuring means) that detects an object around the vehicle to output signals corresponding to the distance to the object, for example.

In the following description, the power-requiring devices PD1 to PD9, PCD1, and PCD2 conceptually include the power-requiring communication devices PCD1 and PCD2. The communication devices CD1 to CD8, PCD1, and PCD2 also conceptually include the power-requiring communication devices PCD1 and PCD2. The power source control boxes 10 are connected to an ECU (e.g., an automatic driving ECU that performs determination of automatic driving), which is not illustrated. The power source control boxes 10 acquire signals from the communication devices CD1 to CD8, PCD1, and PCD2 and supply them to the ECU. The power source control boxes 10 may transmit and receive the signals from the communication devices CD1 to CD8, PCD1, and PCD2 to and from each other, which is not illustrated.

The devices of the fourth type are the power-generating devices PG1 to PG5. The power-generating devices PG1 to PG5 are provided in at least one of the sections A1 to A3 to perform power generation different from that performed by a regenerative brake while the vehicle is traveling. The power-generating devices PG1 to PG5 according to the present embodiment are provided in the respective sections A1 to A3.

More specifically, the first power-generating device PG1 is a solar panel provided outside of a roof portion, for example, to generate electric power with sunlight. The first power-generating device PG1 is provided in the central section A1. The second to the fifth power-generating devices PG2 to PG5 are vibration power generators provided to portions near respective tires to generate electric power with vibration of the vehicle. The second to the fifth power-generating devices PG2 to PG5 are provided in the front section A2 and the rear section A3.

The power-generating devices PG1 to PG5 are connected to the power source control boxes 10 in the respective sections A1 to A3 through the connection wires 40. The power-generating devices PG1 to PG5 transmit electrical energy obtained by power generation to the power source control boxes 10 in the respective sections A1 to A3.

Specifically, the first power-generating device PG1 in the central section A1 is connected to the first power source control box 10a in the central section A1 through the connection wire 40. The first power-generating device PG1 outputs electrical energy obtained by power generation to the first power source control box 10a. Similarly, the second and the third power-generating devices PG2 and PG3 in the front section A2 are connected to the second power source control box 10b in the front section A2 through the connection wires 40. The second and the third power-generating devices PG2 and PG3 output electrical energy obtained by power generation to the second power source control box 10b. Similarly, the fourth and the fifth power-generating devices PG4 and PG5 in the rear section A3 are connected to the third power source control box 10c in the rear section A3 through the connection wires 40. The fourth and the fifth power-generating devices PG4 and PG5 output electrical energy obtained by power generation to the third power source control box 10c.

The wire harness 1 according to the present embodiment includes a plurality of area drivers AD1 to AD7. The power source control boxes 10 are connected to the various types of devices PD1 to PD9, CD1 to CD8, PCD1, and PCD2 via the area drivers AD1 to AD7.

The area drivers AD1 to AD7 are connected to the power wires 20 and the communication wires 30 extending from the power source control boxes 10. The area drivers AD1 to AD7 are each connected to three or more devices in a predetermined area out of one or more of the communication devices CD1 to CD3, PCD1, and PCD2 and one or more of the power-requiring devices PD1 to PD5, PCD1, and PCD2. The area herein is conceptually different from the sections A1 to A3, and the area drivers AD1 to AD7 are provided to the respective areas.

The power wires 20 are electric wires extending from the power source control boxes 10 and connected to the area drivers AD1 to AD7. The power wires 20 are arranged to supply electric power to the power-requiring devices PD1 to PD5, PCD1, and PCD2. The communication wires 30 are electric wires extending from the power source control boxes 10 and connected to the area drivers AD1 to AD7. The communication wires 30 are arranged to perform communications with the communication devices CD1 to CD3, PCD1, and PCD2. Because the communication wires 30 do not supply electric power, they tend to be electric wires having a diameter smaller than that of the power wires 20.

The following describes the connection relation of the area drivers AD1 to AD7 in greater detail. The first power source control box 10a in the central section A1 is connected to the first to the third area drivers AD1 to AD3 through the power wires 20 and the communication wires 30. The second power source control box 10b in the front section A2 is connected to the fourth and the fifth area drivers AD4 and AD5 through the power wires 20 and the communication wires 30. The third power source control box 10c in the rear section A3 is connected to the sixth and the seventh area drivers AD6 and AD7 through the power wires 20 and the communication wires 30.

The first area driver AD1 is connected to one device PD1 and two communication devices CD1 and CD2 in a right front door area (predetermined area). The first area driver AD1 is connected to the power-requiring device PD1 through an individual power wire W1 and to the two communication devices CD1 and CD2 through respective individual communication wires W2.

Electric power from the first power source control box 10a is supplied to the first area driver AD1 through the power wire 20. The electric power is then supplied to the power-requiring device PD1 from the first area driver AD1 through the individual power wire W1. Signals from the two communication devices CD1 reach the first area driver AD1 through the respective individual communication wires W2. The signals are then transmitted to the first power source control box 10a from the first area driver AD1 through the communication wire 30.

The second area driver AD2 is connected to two power-requiring devices PD2 and PD3 through the respective individual power wires W1 and to one communication device CD3 through the individual communication wire W2 in a right rear door area (predetermined area). Electric power from the first power source control box 10a is supplied to the two power-requiring devices PD2 and PD3 through the power wire 20, the second area driver AD2, and the respective individual power wires W1. Signals from the communication device CD3 are transmitted to the first power source control box 10a through the individual communication wire W2, the second area driver AD2, and the communication wire 30.

The third area driver AD3 is connected to two power-requiring devices PD4 and PD5 through the respective individual power wires W1 and to one communication device CD4 through the individual communication wire W2 in a roof area (predetermined area). Electric power from the first power source control box 10a is supplied to the two power-requiring devices PD4 and PD5 through the power wire 20, the third area driver AD3, and the respective individual power wires W1. Signals from the communication device CD4 are transmitted to the first power source control box 10a through the individual communication wire W2, the third area driver AD3, and the communication wire 30.

The fourth area driver AD4 is connected to one power-requiring communication device PCD1 through the individual power wire W1 and to one communication device CD5 through the individual communication wire W2 in an engine room right area (predetermined area). Electric power from the second power source control box 10b is supplied to one power-requiring communication device PCD1 through the power wire 20, the fourth area driver AD4, and the individual power wire W1. As a result, the power-requiring communication device PCD1 drives to acquire information or the like. The power-requiring communication device PCD1 then transmits signals corresponding to the information or the like to the second power source control box 10b through the individual communication wire W2, the fourth area driver AD4, and the communication wire 30. Similarly, signals from the communication device CD5 are transmitted to the second power source control box 10b through the individual communication wire W2, the fourth area driver AD4, and the communication wire 30.

The fifth area driver AD5 is connected to one power-requiring communication device PCD2 through the individual power wire W1 and to one communication device CD6 through the individual communication wire W2 in an engine room left area (predetermined area). Electric power from the second power source control box 10b is supplied to one power-requiring communication device PCD2 through the power wire 20, the fifth area driver AD5, and the individual power wire W1. As a result, the power-requiring communication device PCD2 drives to acquire information or the like. The power-requiring communication device PCD2 then transmits signals corresponding to the information or the like to the second power source control box 10b through the individual communication wire W2, the fifth area driver AD5, and the communication wire 30. Similarly, signals from the communication device CD6 are transmitted to the second power source control box 10b through the individual communication wire W2, the fifth area driver AD5, and the communication wire 30.

The power-requiring communication devices PCD1 and PCD2 have both functions of an power-requiring device and a communication device. The power-requiring communication devices PCD1 and PCD2 are each equivalent to one power-requiring device and one communication device and conceptually correspond to the two devices. Therefore, the fourth area driver AD4 is connected to three devices PCD1 and CD5 in the engine room right area, whereas the fifth area driver AD5 is connected to three devices PCD2 and CD6 in the engine room left area.

The sixth area driver AD6 is connected to two power-requiring devices PD6 and PD7 through the respective individual power wires W1 and to one communication device CD7 through the individual communication wire W2 in a vehicle rear right area (predetermined area). Electric power from the third power source control box 10c is supplied to the two power-requiring devices PD6 and PD7 through the power wire 20, the sixth area driver AD6, and the respective individual power wires W1. Signals from the communication device CD7 are transmitted to the third power source control box 10c through the individual communication wire W2, the sixth area driver AD6, and the communication wire 30.

The seventh area driver AD7 is connected to two power-requiring devices PD8 and PD9 through the respective individual power wires W1 and to one communication device CD8 through the individual communication wire W2 in a vehicle rear left area (predetermined area). Electric power from the third power source control box 10c is supplied to the two power-requiring devices PD8 and PD9 through the power wire 20, the seventh area driver AD7, and the respective individual power wires W1. Signals from the communication device CD8 are transmitted to the third power source control box 10c through the individual communication wire W2, the seventh area driver AD7, and the communication wire 30.

Because the wire harness 1 has the wiring structure described above, the power source control boxes 10 need not be connected to the devices PD1 to PD9, CD1 to CD8, PCD1, and PCD2 directly by the power wires 20 and the communication wires 30. Specifically, the area drivers AD1 to AD7 are disposed between the power source control boxes 10 and three or more of the devices PD1 to PD9, CD1 to CD8, PCD1, and PCD2. With this configuration, the power source control boxes 10 simply need to be connected to the area drivers AD1 to AD7 by one power wire 20 and one communication wire 30, for example. As a result, this configuration has a reduced number of electric wires between the power source control boxes 10 and the area drivers AD1 to AD7.

The area drivers AD1 to AD7 each include a path selecting means so as to appropriately supply the electric power from the power source control boxes 10 to the devices PD1 to PD9, PCD1, and PCD2. The area drivers AD1 to AD7 supply the electric power to any one or more of the power-requiring devices PD1 to PD9, PCD1, and PCD2 selected by the path selecting means. Signals for selecting a path are transmitted from the power source control boxes 10 through the communication wires 30. Alternatively, the area drivers AD1 to AD7 each may include no path selecting unit. In this case, the electric power from the power source control boxes 10 is simply divided in the area drivers AD1 to AD7 and supplied to the power-requiring devices PD1 to PD9, PCD1, and PCD2.

In the wire harness 1, the power-generating devices PG1 to PG5 are connected to the power source control boxes 10 in the respective sections A1 to A3 through the connection wires 40. The power-generating devices PG1 to PG5 transmit electrical energy obtained by power generation to the power source control boxes 10 in the respective sections A1 to A3. When receiving the electrical energy generated by the power-generating devices PG1 to PG5 through the connection wires 40, the power source control boxes 10 supply it to the power-requiring devices PD1 to PD9, PCD1, and PCD2 in the sections A1 to A3 in which the respective power source control boxes 10 are provided.

Specifically, the electrical energy generated by the first power-generating device PG1 is transmitted to the first power source control box 10a and supplied to any one or more of the power-requiring devices PD1 to PD5. One device to be supplied with the electrical energy generated by the first power-generating device PG1 may be determined in advance out of the five power-requiring devices PD1 to PD5 in the central section A1. Alternatively, one or more devices to be supplied with the electrical energy may be determined in the first power source control box 10a.

Similarly, the electrical energy generated by the second and the third power-generating devices PG2 and PG3 is transmitted to the second power source control box 10b and supplied to any one or more of the power-requiring communication devices PCD1 and PCD2. One device to be supplied with the electrical energy may be determined in advance out of the two power-requiring communication devices PCD1 and PCD2 in the front section A2. Alternatively, one or more devices to be supplied with the electrical energy may be determined in the second power source control box 10b.

In addition, the electrical energy generated by the fourth and the fifth power-generating devices PG4 and PG5 is transmitted to the third power source control box 10c and supplied to any one or more of the power-requiring devices PD6 to PD9. One device to be supplied with the electrical energy may be determined in advance out of the four power-requiring devices PD6 to PD9 in the rear section A3. Alternatively, one or more devices to be supplied with the electrical energy may be determined in the third power source control box 10c.

Figure 2:
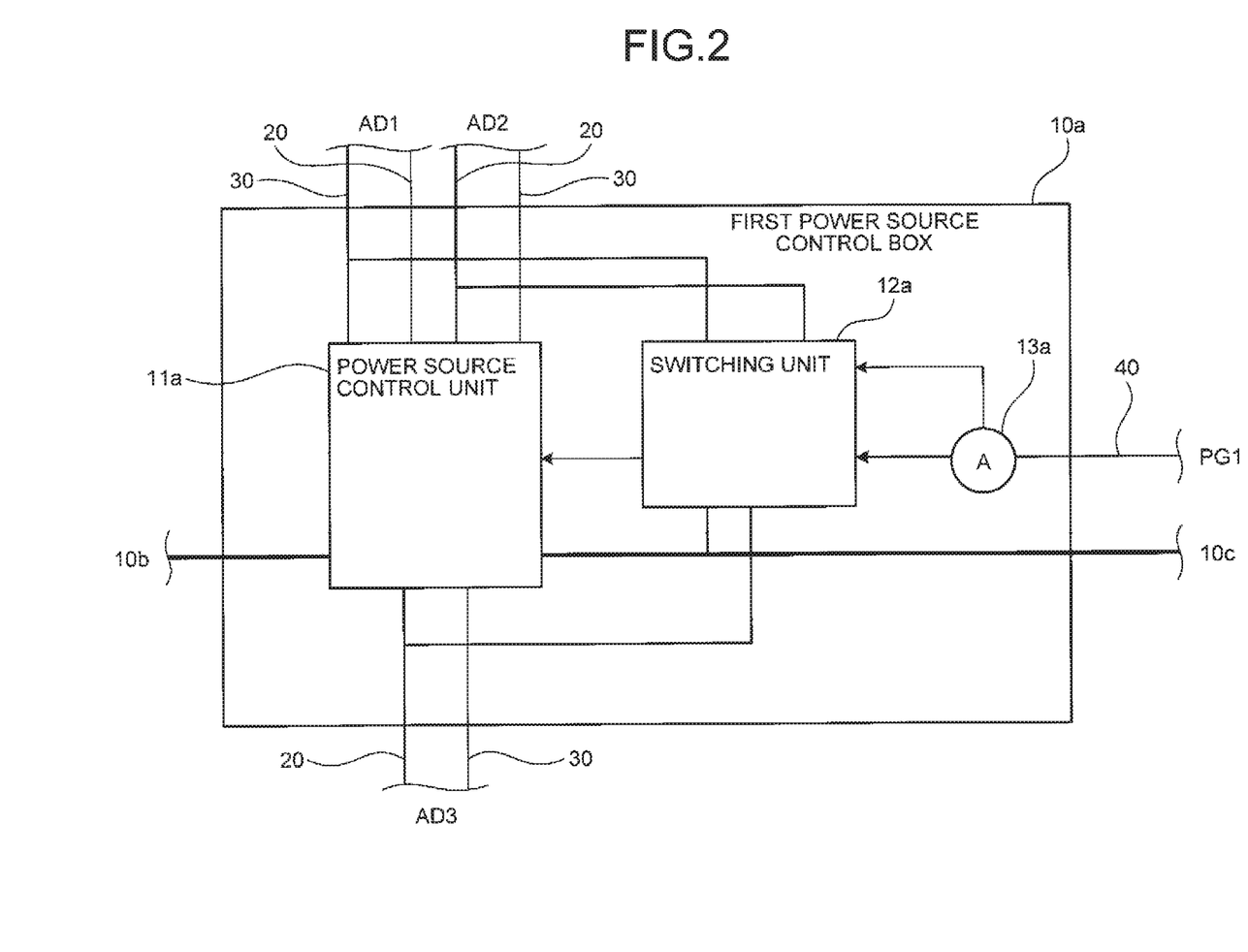
FIG. 2 is a schematic diagram illustrating an internal configuration of a first power source control box 10a illustrated in FIG. 1.

FIG. 2 is a schematic diagram illustrating an internal configuration of the first power source control box 10a illustrated in FIG. 1. As illustrated in FIG. 2, the first power source control box 10a includes a power source control unit 11a, a switching unit (switching means) 12a, and a current sensor 13a. The power source control unit 11a performs control for supplying electric power from the vehicle battery B to the power-requiring devices PD1 to PD5. The power source control unit 11a transmits the electric power from the vehicle battery B to the first to the third area drivers AD1 to AD3 through the power wires 20. The power source control unit 11a receives signals from the communication devices CD1 to CD4 (the first to the third area drivers AD1 to AD3).

The switching unit 12a switches between a first state to supply the electrical energy from the first power-generating device PG1 to the power-requiring devices PD1 to PD5 in the central section A1 and a second state not to supply it to the devices PD1 to PD5. The first power-generating device PG1 has a stabilization function to stabilize the generated electrical energy at a predetermined voltage. As a result, the electrical energy received by the switching unit 12a is maintained at the predetermined voltage. The stabilization function is not necessarily provided to the first power-generating device PG1 and may be provided to a portion between the first power-generating device PG1 and the first power source control box 10a (e.g., on the connection wire 40).

The stabilization function is also provided to alternators mounted to electric vehicles and hybrid vehicles, for example. As a result, electrical energy generated by a regenerative brake is also maintained at the predetermined voltage. While alternators originally generate alternating-current (AC) electricity, the AC electricity is converted into direct-current (DC) electricity by a diode or a rectifier. Because alternators generate electrical energy having an excessively high voltage when an engine is running at high speed, the alternators include a voltage stabilizer called a voltage regulator. In a case where the first power-generating device PG1 generates AC electricity, the stabilization function indicates a component, such as a diode and a rectifier, and a voltage regulator.

By contrast, in a case where the first power-generating device PG1 generates DC electricity, the stabilization function may be a component that discards the generated electrical energy (ground connection) when it has a voltage lower than the predetermined voltage and trims the electricity having a voltage equal to or higher than the predetermined voltage to the predetermined voltage.

In other words, the switching unit 12a simply needs to receive electrical energy at the predetermined voltage from the first power-generating device PG1. The stabilization function is not limited to the components described above and may be components according to other known technologies.

The current sensor 13a measures the current value of electrical energy supplied through the connection wire 40. The current sensor 13a transmits information on the measured current value to the switching unit 12a. Based on the information on the current value, the switching unit 12a switches between the first state and the second state.

More specifically, when the first power-generating device PG1 supplies electrical energy having a voltage of a predetermined value to operate the power-requiring devices PD1 to PD5, the switching unit 12a switches to the first state if the current value of the electrical energy is equal to or higher than a value set to be sufficiently high to operate the power-requiring devices PD1 to PD5. This mechanism can supply electric power sufficiently high to operate the power-requiring devices PD1 to PD5.

Let us assume a case where all the values of electric power required for the power-requiring devices PD1 to PD5 are equal in the central section A1. In this case, the switching unit 12a stores therein a current value (set value) required to operate one of the power-requiring devices PD1 to PD5. If the current value of the electrical energy supplied through the connection wire 40 is equal to or higher than the set value, the switching unit 12a determines to supply the electric power to the power-requiring device PD1, for example. The switching unit 12a then supplies the electrical energy to the power wire 20 extending to the first area driver AD1.

The switching unit 12a also stores therein current values required to operate two, three, four, or five of the power-requiring devices PD1 to PD5. If the current value of the electrical energy supplied through the connection wire 40 is equal to or higher than the current value required to operate two of the power-requiring devices PD1 to PD5, the switching unit 12a determines to supply the electric power to the power-requiring devices PD2 and PD3, for example. The switching unit 12a then supplies the electrical energy to the power wire 20 extending to the second area driver AD2.

Similarly, if the current value is equal to or higher than the current value required to operate three of the devices, the switching unit 12a determines to supply the electric power to the power-requiring devices PD1 to PD3, for example. The switching unit 12a then supplies the electrical energy to the respective power wires 20 extending to the first and the second area drivers AD1 and AD2. If the current value is equal to or higher than the current value required to operate four of the devices, the switching unit 12a determines to supply the electric power to the power-requiring devices PD2 to PD5, for example. The switching unit 12a then supplies the electrical energy to the respective power wires 20 extending to the second and the third area drivers AD2 and AD3.

If the current value is equal to or higher than the current value required to operate five of the devices, the switching unit 12a determines to supply the electric power to all the power-requiring devices PD1 to PD5. The switching unit 12a then supplies the electrical energy to the respective power wires 20 extending to the first to the third area drivers AD1 to AD3.

Because the power-requiring devices PD1 to PD5 are supplied with the electrical energy from the first power-generating device PG1, they need not be supplied with electric power from the vehicle battery B. The switching unit 12a transmits, to the power source control unit 11a, information on the power-requiring devices PD1 to PD5 to be supplied with the electrical energy from the first power-generating device PG1. As a result, the power source control unit 11a cuts off electric power supplied from the vehicle battery B to the power-requiring devices PD1 to PD5.

If the current value of the electrical energy supplied through the connection wire 40 is lower than the current value required to operate one of the power-requiring devices PD1 to PD5, that is, if the switching unit 12a is in the second state, the switching unit 12a may connect the connection wire 40 to the ground. The switching unit 12a according to the present embodiment connects the connection wire 40 to the main power wire PW, thereby storing the electrical energy in the vehicle battery B. As described above, if the electrical energy can operate none of the power-requiring devices PD1 to PD5, the switching unit 12a stores it in the vehicle battery B. This configuration can prevent the generated electrical energy from being wasted.

While all the values of electric power required for the power-requiring devices PD1 to PD5 are assumed to be equal in the description above, the embodiment is not limited thereto. The embodiment may store therein current values corresponding to the values of electric power required for the respective power-requiring devices PD1 to PD5 to supply the electrical energy in the same manner as described above.

Figure 3:
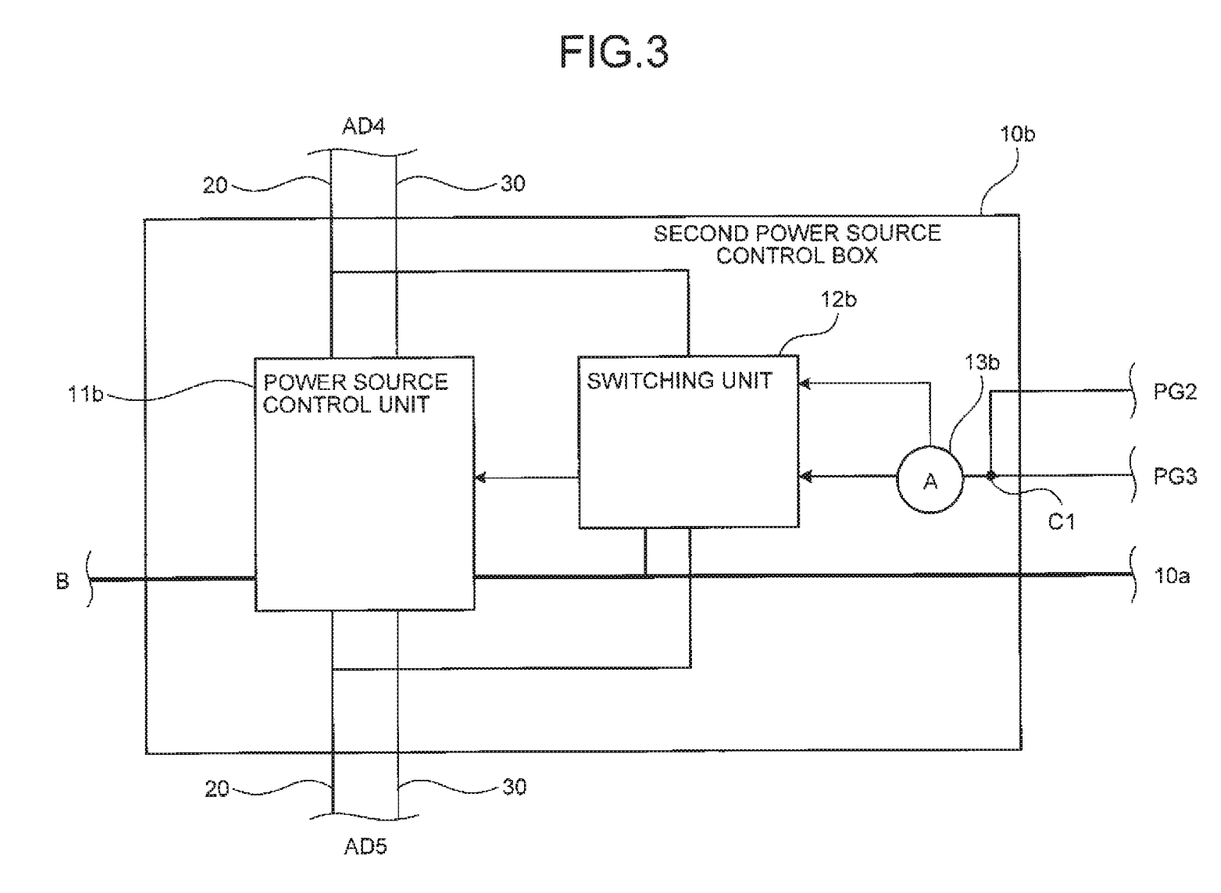
FIG. 3 is a schematic diagram illustrating an internal configuration of a second power source control box 10b illustrated in FIG. 1.

FIG. 3 is a schematic diagram illustrating an internal configuration of the second power source control box 10b illustrated in FIG. 1. While the internal configuration of the second power source control box 10b is the same as that of the first power source control box 10a, a part thereof is different as described below.

As described above, the second power source control box 10b is connected to two (a plurality of) power-generating devices PG2 and PG3. In the second power source control box 10b, the connection wires 40 of the respective two (a plurality of) power-generating devices PG2 and PG3 join at a connecting point C1. A current sensor 13b is provided on the path from the connecting point C1 to a switching unit 12b of the second power source control box 10b. Based on the current value measured by the current sensor 13b, the switching unit 12b switches between the first state and the second state and determines the number of the power-requiring communication devices PCD1 and PCD2 to be supplied with the electrical energy in the same manner as that of the first power source control box 10a.

Figure 4:
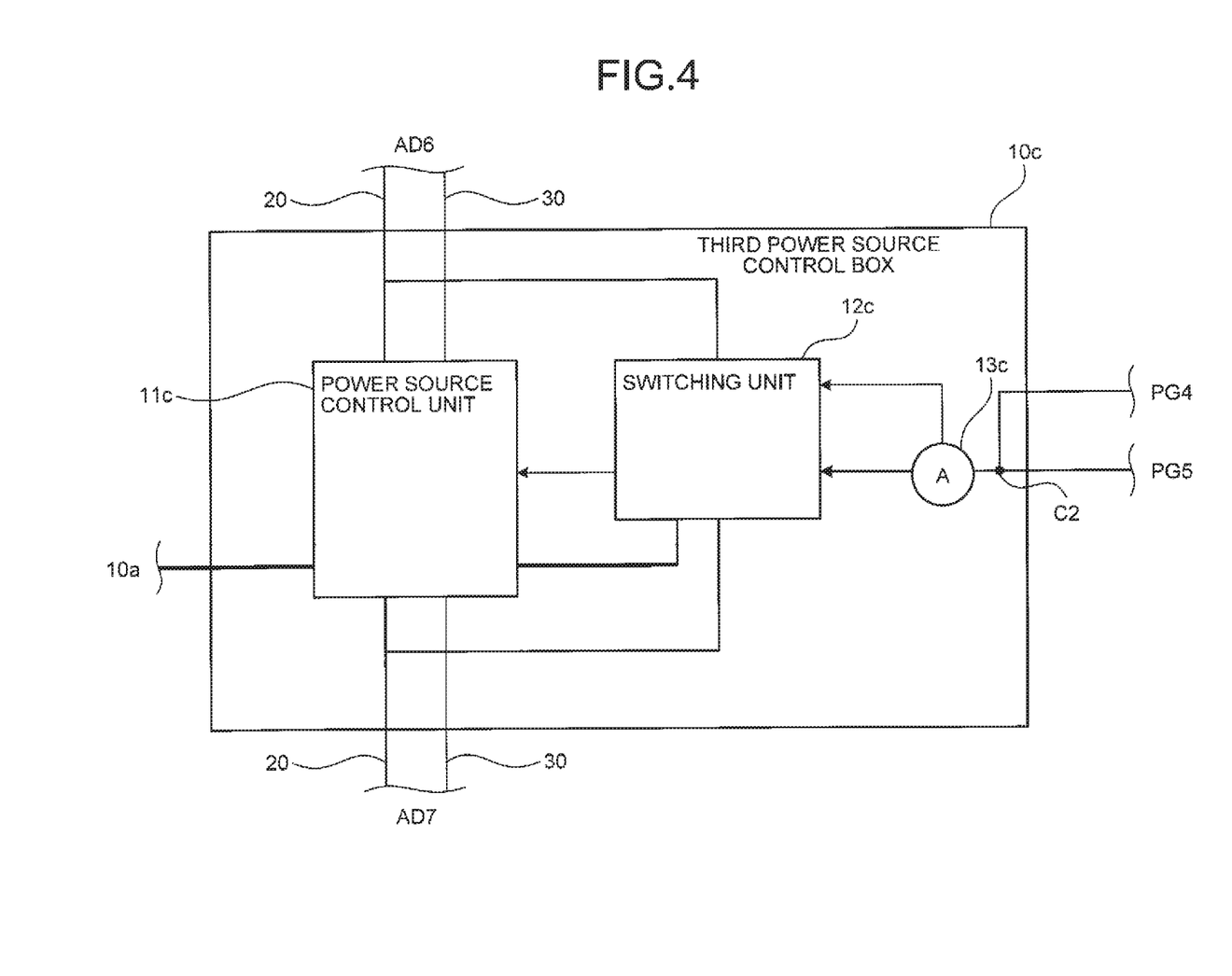
FIG. 4 is a schematic diagram illustrating an internal configuration of a third power source control box 10c illustrated in FIG. 1.

FIG. 4 is a schematic diagram illustrating an internal configuration of the third power source control box 10c illustrated in FIG. 1. While the internal configuration of the third power source control box 10c is also the same as that of the first power source control box 10a, a part thereof is different as described below.

Similarly to the second power source control box 10b, the third power source control box 10c is connected to two (a plurality of) power-generating devices PG4 and PG5. A current sensor 13c is provided on the path from a connecting point C2 to a switching unit 12c of the third power source control box 10c.

The third power source control box 10c is connected to the sixth and the seventh area drivers AD6 and AD7. The sixth area driver AD6 is connected to two power-requiring devices PD6 and PD7, and the seventh area driver AD7 is connected to two power-requiring devices PD8 and PD9. If the current sensor 13c detects a current value sufficiently high to operate one of the power-requiring devices PD6 to PD9 but do not detect a current value sufficiently high to operate two of them, any two of the power-requiring devices PD6 to PD9 fail to be operated.

To address this, if the current sensor 13c detects a current value equal to or higher than a predetermined value to be sufficiently high to operate two of the power-requiring devices PD6 to PD9, the switching unit 12c of the third power source control box 10c switches to the first state. By contrast, if the current sensor 13c detects no current value equal to or higher than the predetermined value, the switching unit 12c switches to the second state.

In the wire harness 1 according to the present embodiment, the power wires 20 and the communication wires 30 that connect the first power source control box 10a to the first and the second area drivers AD1 and AD2 are arranged at flex portions where the electric wires 20 and 30 are repeatedly bent. More specifically, the first and the second area drivers AD1 and AD2 are provided to door areas. Because a vehicle door is opened and closed a plurality of times, electric wires that connect the vehicle body and the door are repeatedly bent depending on the opening and closing of the door. The power wires 20 and the communication wires 30 connected to the first and the second area drivers AD1 and AD2 correspond to the electric wires repeatedly bent.

Figure 5:
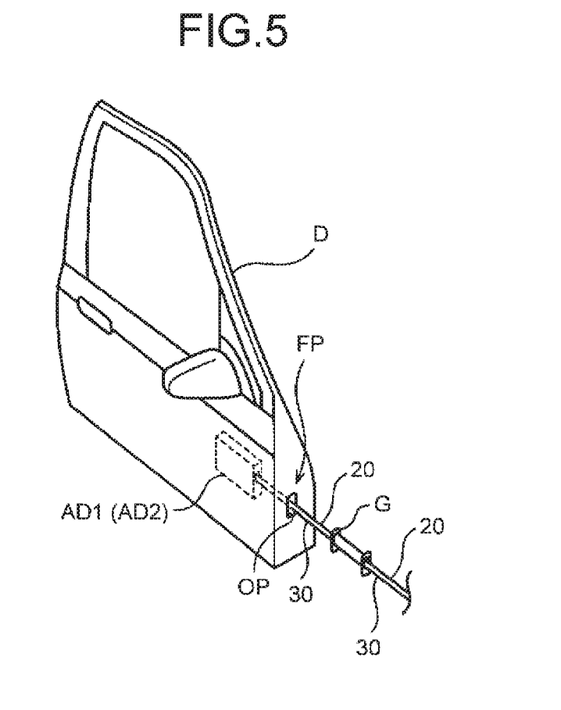
FIG. 5 is a schematic diagram illustrating an example of a flex portion.

FIG. 5 is a schematic diagram illustrating an example of a flex portion. As illustrated in FIG. 5, a door D has an opening OP through which the power wire 20 and the communication wire 30 are arranged. The first and the second area drivers AD1 and AD2 are included not in the vehicle body side but in the door D side. To protect the power wire 20 and the communication wire 30 and make them waterproof, the opening OP is provided with a grommet G, for example. The arrangement position of the grommet G or the like corresponds to a flex portion FP.

This configuration has a reduced number of electric wires at the flex portion FP (that is, the flex portion FP is provided only with the power wire 20 and the communication wire 30 and with no individual communication wire W2 or no individual power wire W1). In other words, a large number of electric wires having high flex resistance need not be provided to the flex portion FP, and only the power wire 20 and the communication wire 30 have high flex resistance. This configuration thus has a reduced number of electric wires having high flex resistance.

The flex portion FP is not limited to the arrangement position of the grommet G or the like in the door and may be another position as long as it is a position where the electric wires are repeatedly bent. Electric wires arranged in a steering, for example, are also repeatedly bent depending on steering operations. The position where the electric wires are bent in this manner also corresponds to the flex portion FP.

Because the first and the second area drivers AD1 and AD2 according to the present embodiment are provided in the doors or the steering, they are arranged closer to the devices PD1 to PD3 and CD1 to CD3. This configuration can further reduce the distance of a portion having a large number of electric wires (that is, the distance of the individual power wires W1 and the individual communication wires W2).

The power wire 20 and the communication wire 30 that connect the first power source control box 10a to the third area driver AD3 are provided in a pillar.

Figure 6:
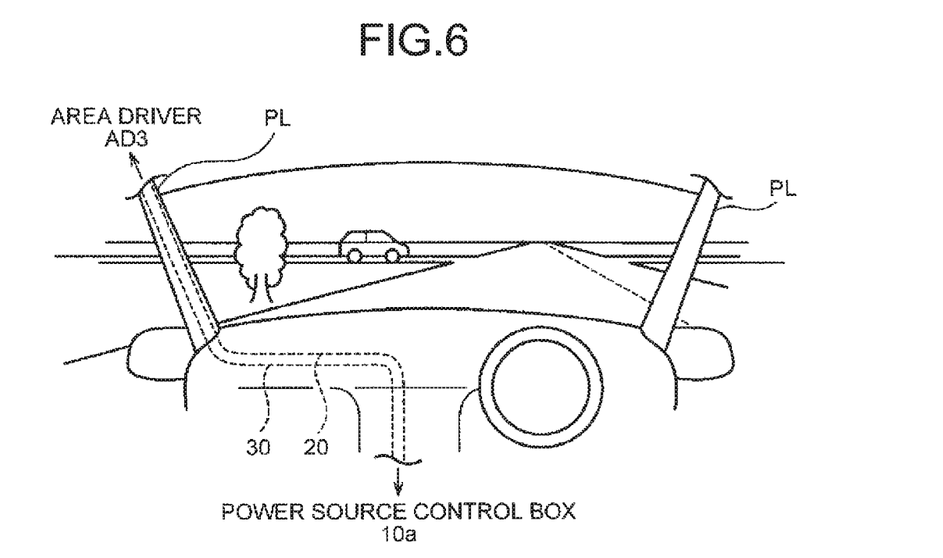
FIG. 6 is a schematic diagram illustrating a wiring state of a power wire 20 and a communication wire 30 that connect the first power source control box 10a to a third area driver AD3.

FIG. 6 is a schematic diagram illustrating a wiring state of the power wire 20 and the communication wire 30 that connect the first power source control box 10a to the third area driver AD3. As illustrated in FIG. 6, for example, a pillar (front "A" pillar PL in FIG. 6) is provided as a component supporting the roof of the vehicle. The pillar has a hollow inside, and the power wire 20 and the communication wire 30 that connect the power source control box 10a to the third area driver AD3 are arranged in the A pillar PL, that is, in a pillar hollow portion, for example. The third area driver AD3 is provided to the ceiling side.

Because pillars typically obstruct the driver's field of vision, they are preferably made thinner as long as they can support the ceiling. The power wire 20 and the communication wire 30 that connect the power source control box 10a to the third area driver AD3 are arranged in the A pillar. With this configuration, a narrow area of the A pillar PL is provided not with a number of electric wires but with the power wire 20 and the communication wire 30 unlike the conventional technologies. This configuration can make the A pillar PL thinner, thereby widening the driver's field of vision.

Because the third area driver AD3 according to the present embodiment is provided to the ceiling, the third area driver AD3 is arranged closer to the devices PD4, PD5, and CD4. This configuration can further reduce the distance of a portion having a large number of electric wires.

At least one of the power wire 20 and the communication wire 30 is arranged through a through hole formed in a specific member to secure the wiring route.

The door D (specific member) illustrated in FIG. 5, for example, has a through hole referred to as the opening OP to secure the wiring route. As described above, the opening OP is provided with the grommet G. The grommet G, for example, prevents rainwater or the like from entering the door D through the opening OP.

To downsize a water stop member, such as the grommet G, and prevent penetration of rainwater or the like, the opening OP is preferably a small hole. The power source control box 10 is connected to the first and the second area drivers AD1 and AD2 by the power wire 20 and the communication wire 30 through the opening OP. This configuration can prevent deterioration in the waterproof property caused by a larger opening OP and an increase in the size of the grommet G attached to the opening OP, for example.

The following describes use of the generated electrical energy in the wire harness 1 according to the present embodiment. The first power-generating device PG1 generates electric power with sunlight. The electrical energy obtained by the power generation is maintained at the predetermined voltage by the stabilization function. The electrical energy at the predetermined voltage is supplied to the first power source control box 10a in the same section through the connection wire 40.

The current sensor 13a of the first power source control box 10a measures the current value of the supplied electrical energy and transmits information on the measured current value to the switching unit 12a. As a result, the switching unit 12a determines whether to switch to the first state or the second state. If the measured current value is equal to or higher than the predetermined value, the switching unit 12a switches to the first state. The switching unit 12a supplies the electrical energy to the power-requiring devices PD1 to PD5.

By contrast, if the measured current value is lower than the predetermined value, the switching unit 12a switches to the second state. The switching unit 12a supplies the electrical energy to the main power wire PW to store it in the vehicle battery B. The processing described above is also performed by the second power source control box 10b and the third power source control box 10c.

As described above, the wire harness 1 according to the present embodiment includes the power source control boxes 10 and the connection wires 40. The power source control boxes 10 are provided to the respective sections A1 to A3 obtained by dividing the vehicle. The connection wires 40 connect the power-generating devices PG1 to PG5 provided to at least one of the sections to perform power generation to the power source control boxes 10 in the respective sections A1 to A3. The electrical energy from the power-generating devices PG1 to PG5 is transmitted to the power source control boxes 10 in the respective sections A1 to A3. With this configuration, the electrical energy is supplied to the power source control boxes 10 through relatively short wiring. When receiving the electrical energy generated by the power-generating devices PG1 to PG5, the power source control boxes 10 supply it to the power-requiring devices PD1 to PD9, PCD1, and PCD2 in the sections A1 to A3 in which the respective power source control boxes 10 are provided. As a result, the power source control boxes 10 supply the electrical energy directly to the power-requiring devices PD1 to PD9, PCD1, and PCD2 in the respective sections A1 to A3 without storing it in the vehicle battery B. The wire harness 1 thus can reduce a loss in the generated electrical energy when being guided to the power source control boxes 10 and a loss in the electrical energy when being guided from the power source control boxes 10 to the power-requiring devices PD1 to PD9, PCD1, and PCD2. The wire harness 1 can also reduce a charging loss in the electrical energy when being stored in the vehicle battery B. Consequently, the present embodiment can provide the wire harness 1 that can supply the electrical energy from the power-generating devices PG1 to PG5 more efficiently to the power-requiring devices PD1 to PD9, PCD1, and PCD2.

In a case where the power-generating devices PG1 to PG5 supply electrical energy having a voltage of the predetermined value to operate the power-requiring devices PD1 to PD9, PCD1, and PCD2, that is, where a stabilization function that maintains the electrical energy at the predetermined voltage is provided to the power-generating devices PG1 to PG5 or a portion between the power-generating devices PG1 to PG5 and the power source control boxes 10, a drive voltage for the power-requiring devices PD1 to PD9, PCD1, and PCD2 is secured. If a monitored current value is equal to or higher than the set value, the power source control boxes 10 supply the electrical energy from the power-generating devices PG1 to PG5 to the power-requiring devices PD1 to PD9, PCD1, and PCD2. With this configuration, the wire harness 1 can prevent the power source control boxes 10 from supplying, to the power-requiring devices PD1 to PD9, PCD1, and PCD2, insufficient electrical energy to operate them and thus prevent the power-requiring devices PD1 to PD9, PCD1, and PCD2 from failing to operate.

When the switching units 12a to 12c are in the second state, they supply the electrical energy from the power-generating devices PG1 to PG5 to the vehicle battery B. If the switching units 12a to 12c receive insufficient electrical energy to operate the power-requiring devices PD1 to PD9, PCD1, and PCD2, the switching units 12a to 12c store it in the vehicle battery B without discarding it. With this configuration, the wire harness 1 can prevent the generated electrical energy from being wasted by storing it when the amount of generated power is small.

The wire harness 1 according to the present embodiment includes the area drivers AD1 to AD7. The area drivers AD1 to AD7 are each connected to three or more of the devices PD1 to PD9, CD1 to CD8, PCD1, and PCD2 in a predetermined area out of one or more of the power-requiring devices PD1 to PD9, PCD1, and PCD2 and one or more of the communication devices CD1 to CD8, PCD1, and PCD2. With this configuration, the power source control boxes 10 need not be connected to the devices PD1 to PD9, CD1 to CD8, PCD1, and PCD2 by the power wires 20 and the communication wires 30. The area drivers AD1 to AD7 are disposed between the power source control boxes 10 and three or more of the devices PD1 to PD9, CD1 to CD8, PCD1, and PCD2. As a result, the power source control boxes 10 simply need to be connected to the area drivers AD1 to AD7 by one power wire 20 and one communication wire 30, for example. This configuration thus has a reduced number of electric wires between the power source control boxes 10 and the area drivers AD1 to AD7, resulting in a reduced weight and a reduced diameter of the wire harness 1. Because the area drivers AD1 to AD7 are each connected to three or more of the devices PD1 to PD9, CD1 to CD8, PCD1, and PCD2 in the predetermined area, they each function as a device that collectively controls the predetermined area, such as a door and a roof. The area drivers AD1 to AD7 can be arranged closer to the door, the roof, or the like. This configuration can secure a long distance between the power source control boxes 10 and the area drivers AD1 to AD7, thereby shortening the portion having a large number of electric wires after the area drivers AD1 to AD7 as much as possible. As a result, the weight of the wire harness 1 can be further reduced. As described above, the present embodiment can improve the fuel efficiency and the wiring performance.

The power wires 20 and the communication wires 30 that connect the power source control box 10 to the first and the second area drivers AD1 and AD2 are arranged at the flex portions FP where the electric wires are repeatedly bent. This configuration has a reduced number of electric wires at the flex portion FP. In other words, a large number of electric wires having high flex resistance need not be provided to the flex portion FP, and only the power wires 20 and the communication wires 30 have high flex resistance. This configuration thus has a reduced number of electric wires having high flex resistance.

The power wire 20 and the communication wire 30 that connect the power source control box 10 to the third area driver AD3 are provided in the A pillar PL. With this configuration, a narrow area of the A pillar PL is provided not with a number of electric wires but with the power wire 20 and the communication wire 30 unlike the conventional technologies. The present embodiment thus can provide the wire harness 1 that can make the A pillar PL thinner.

The power source control box 10 is connected to the first and the second area drivers AD1 and AD2 by the power wires 20 and the communication wires 30 extending through the opening OP formed in the door D to secure the wiring route. As described above, the opening OP is provided not with a number of electric wires but with the power wire 20 and the communication wire 30 unlike the conventional technologies. This configuration can reduce the size of the opening OP itself, thereby preventing deterioration in the waterproof property caused by a larger opening OP and an increase in the size of the grommet G attached to a through hole, for example.

While an embodiment of the present invention has been described, the embodiment above is not intended to limit the invention. Various changes may be made without departing from the spirit of the invention, and other technologies may be combined with the embodiment within a possible range.

While the power source control boxes 10 according to the present embodiment receive electrical energy at the predetermined voltage from the power-generating devices PG1 to PG5, for example, the embodiment is not limited thereto. The received electrical energy does not necessarily have the predetermined voltage. If the received electrical energy has a voltage the value of which fluctuates, such as an AC voltage, the voltage may be stabilized in the power source control boxes 10. In a case where the power-requiring devices PD1 to PD9 are devices that can respond to fluctuation of the voltage, such as a fan, the power source control boxes 10 may supply the electrical energy without stabilizing it.

While the power source control boxes 10 according to the present embodiment receive electrical energy at the predetermined voltage and store, when the current value is not equal to or higher than the predetermined value, the electrical energy in the vehicle battery B, the embodiment is not limited thereto. The power source control boxes 10 may supply the electrical energy to the power-requiring devices PD1 to PD9, PCD1, and PCD2. In this case, the power-requiring devices PD1 to PD9, PCD1, and PCD2 may possibly fail to receive electric power sufficiently high to operate. To address this, the power source control units 11$a$ to 11$c$ of the respective power source control boxes 10 operate to compensate for the deficiency in the current value.

To store the generated electrical energy in the vehicle battery B, the power source control boxes 10 may store it through a charge dedicated wire instead of the main power wire PW.

Some of the power-requiring devices PD1 to PD9, PCD1, and PCD2 may be devices that need not continuously operate, such as a motor. The switching unit 12$c$ of the third power source control box 10$c$ switches to the first state when the current value of the generated electrical energy is equal to or higher than a value sufficiently high to operate two of the power-requiring devices PD5 to PD9. The third power source control box 10$c$ may perform monitoring to determine whether the power-requiring devices PD5 to PD9 are at a drive timing. If they are not at the drive timing, the switching unit 12$c$ may switch to the first state when the current value is equal to or higher than a value sufficiently high to operate one of the power-requiring devices PD5 to PD9, for example. In other words, the predetermined value described above may vary depending on the operation timing of the power-requiring devices PD1 to PD9, PCD1, and PCD2.

If possible, the following control may be performed. Let us assume a case where only two of the power-requiring devices PD1 to PD5 connected to the first power source control box 10$a$ are at the drive timing, and the power source control box 10$a$ receives generated electrical energy sufficiently high to operate three of them from the first power-generating device PG1, for example. In this case, the power source control box 10$a$ may supply energy for two devices to the two of the power-requiring devices PD1 to PD5 and store energy for one device in the vehicle battery B. In this operation, the power source control box 10$a$, for example, determines the destination of the generated electrical energy in a time-division manner, which depends on the types of the power-requiring devices PD1 to PD5. The power source control box 10$a$ then supplies energy for two devices to the two of the power-requiring devices PD1 to PD5 and store energy for one device in the vehicle battery B. If it is difficult to store the energy for one device, the power source control box 10a may discard it by ground connection.

While the area drivers AD1 to AD7 according to the present embodiment are each connected to three or four devices (assuming that the power-requiring communication devices PCD1 and PCD2 each correspond to two devices), the embodiment is not limited thereto. The area drivers AD1 to AD7 may be each connected to five or more devices. Furthermore, the area drivers AD1 to AD7 are not necessarily provided to the doors, the roof, the engine compartment side, and the vehicle rear portion, for example, and may be provided to other portions.

The area drivers AD1 to AD7 may be connected to any types of connection targets as long as they are connected to three or more of the devices PD1 to PD9, CD1 to CD8, PCD1, and PCD2 by at least three electric wires W1 and W2.

While only three power source control boxes 10 according to the present embodiment are illustrated in the drawings, the embodiment is not limited thereto. The wire harness 1 may include two or four or more power source control boxes 10.

While the flex portions FP are present between the power source control box 10 and the first and the second area drivers AD1 and AD2 in the example illustrated in FIG. 2, the embodiment is not limited thereto. The flex portions FP may be present between the first and the second area drivers AD1 and AD2 and three or more of the devices PD1 to PD9, CD1 to CD8, PCD1, and PCD2. While this configuration has a larger number of electric wires having flex resistance than the configuration described above does, the electric wires having flex resistance need to be provided only to a shorter section between the first and the second area drivers AD1 and AD2 and three or more of the devices PD1 to PD6, CD1 to CD3, PCD1, and PCD2. As a result, no electric wire having high flex resistance need to be provided to a longer section between the power source control box 10 and the first and the second area drivers AD1 and AD2. The present embodiment thus can provide the wire harness 1 produced at lower cost.

The present invention can provide a wire harness that can supply electrical energy from a power-generating device more efficiently to power-requiring devices.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wire harness comprising:
a power source control box provided to a section obtained by dividing a vehicle;
a main power wire configured to supply electric power from a vehicle battery to the power source control box;
an electric wire configured to connect the power source control box to a power-requiring device in the section, the wire harness supplying the electric power supplied from the vehicle battery through the main power wire from the power source control box in the section to the power-requiring device in the section through the corresponding electric wire;
a power-generating device provided in the section, including a solar panel provided outside of a roof portion of the vehicle to generate electric power from sunlight or a vibration power generator provided at near a tire of the vehicle to generate electric power from vibration of the vehicle; and
a connection wire configured to connect the power-generating device to the power source control box provided to the section, wherein
the power source control box is configured to supply electrical energy generated by the power-generating device to the power-requiring device in the section in which the power source control box and the power-generating device are provided when receiving the electrical energy through the connection wire.

2. The wire harness according to claim 1, wherein
the power source control box includes a switching unit that switches between a first state to supply the electrical energy from the power-generating device to the power-requiring device in the same section and a second state not to supply the electrical energy, and
the switching unit switches to the first state when the power-generating device supplies electrical energy having a voltage of a predetermined value to operate the power-requiring device and when a current value of the electrical energy is equal to or higher than a predetermined value to be sufficiently high to operate the power-requiring device.

3. The wire harness according to claim 2, wherein
the switching unit supplies the electrical energy from the power-generating device to the vehicle battery when the switching unit is in the second state.

* * * * *